(12) United States Patent
Kihara et al.

(10) Patent No.: US 7,277,208 B2
(45) Date of Patent: Oct. 2, 2007

(54) HOLOGRAM RECORDING MEDIUM, HOLOGRAM RECORDING AND REPRODUCTION APPARATUS AND METHOD OF PRODUCING A HOLOGRAM RECORDING MEDIUM

(75) Inventors: Nobuhiro Kihara, Kanagawa (JP); Hisayuki Yamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 157 days.

(21) Appl. No.: 11/088,898

(22) Filed: Mar. 25, 2005

(65) Prior Publication Data

US 2005/0219667 A1  Oct. 6, 2005

(30) Foreign Application Priority Data

Mar. 26, 2004  (JP)  ............... 2004-091810

(51) Int. Cl.
*G03H 1/02*  (2006.01)
(52) U.S. Cl. .................. 359/3; 359/35; 369/272.1; 369/275.1
(58) Field of Classification Search ............ None
See application file for complete search history.

(56) References Cited

U.S. PATENT DOCUMENTS

| | | | |
|---|---|---|---|
| 5,285,438 A * | 2/1994 | Marchand et al. .......... 369/103 |
| 5,477,347 A * | 12/1995 | Redfield et al. ............... 359/3 |
| 6,222,651 B1 * | 4/2001 | Fujimoto ..................... 359/24 |
| 2002/0101629 A1 * | 8/2002 | Suganuma .................. 359/35 |
| 2005/0174917 A1 * | 8/2005 | Matsumoto et al. ........ 369/103 |

* cited by examiner

*Primary Examiner*—Arnel Lavarias
(74) *Attorney, Agent, or Firm*—Oblon, Spivak, McClelland, Maier & Neustadt, P.C.

(57) ABSTRACT

A hologram recording medium is provided which can prevent sensitization of a region thereof other than a data recording region thereby to prevent deterioration of a characteristic of the hologram recording medium. The hologram recording medium includes partition members for partitioning a recording material. Upon recording, unnecessary light generated when signal light and reference light enter the recording material is blocked from propagating in the recording material by the partition members and cannot advance into adjacent partitions. Therefore, unnecessary sensitization of the recording material by the unnecessary light can be prevented, and particularly, decrease of the recording capacity can be prevented. Consequently, the performance of a hologram recording and reproduction apparatus which adopts, for example, a multiplex recording system can be exhibited fully.

18 Claims, 8 Drawing Sheets

HOLOGRAM RECORDING MEDIUM, HOLOGRAM RECORDING AND REPRODUCTION APPARATUS AND METHOD OF PRODUCING A HOLOGRAM RECORDING MEDIUM

BACKGROUND OF THE INVENTION

This invention relates to a hologram recording and reproduction apparatus, and more particularly to a hologram recording medium for preventing useless sensitization thereof by unnecessary light and a method of producing a hologram recording medium of the type described.

In recent years, a hologram recording and reproduction apparatus which makes use of a hologram technology to record and reproduce a large amount of data has been proposed and is disclosed, for example, in "Holographic data storage", IBM J. RES DEVELOP, Vol. 44, No. 3, May 2000. The hologram recording and reproduction apparatus has such a general configuration as shown in FIG. 9.

Figure 9:
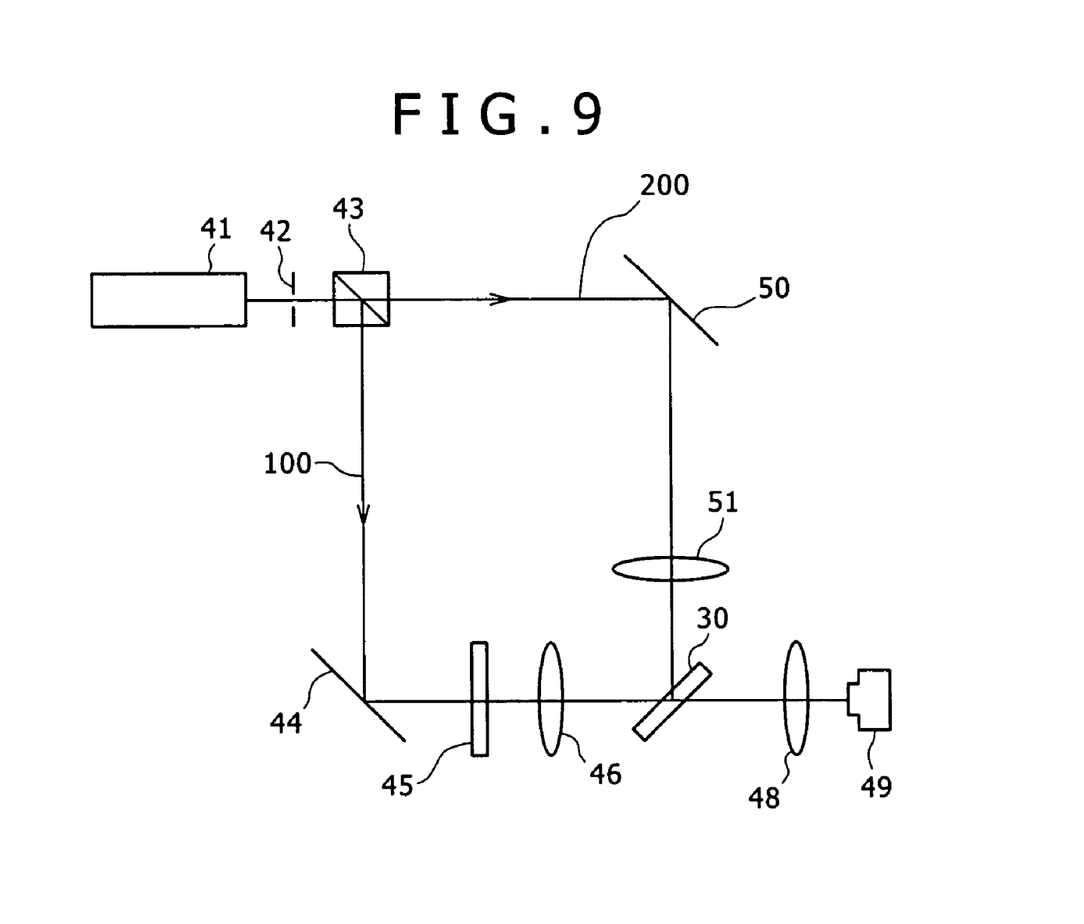
FIG. 9 is a schematic view showing an example of a general configuration of a conventional hologram recording and reproduction apparatus.

Referring to FIG. 9, a coherent laser beam emitted from a laser light source 41 enters a beam splitter 43 through a shutter 42 and is split into signal light 100 and reference light 200 by the beam splitter 43. The signal light 100 enters a spatial light modulator 45 through a mirror 44 and is intensity modulated by the spatial light modulator 45 on which a data page is displayed. The modulated signal light 100 is condensed into a hologram recording medium 30 by a lens 46. Meanwhile, the reference light 200 enters a lens 51 through a mirror 50 and is illuminated on the hologram recording medium 30 through the lens 51. Consequently, the signal light 100 and the reference light 200 interfere with each other in the hologram recording medium 30, and interference fringes formed from the signal light 100 and the reference light 200 are recorded as a fine density pattern in the hologram recording medium 30.

In order to reproduce data recorded in the hologram recording medium 30, illumination reference light same as the reference light 200 is illuminated on the hologram recording medium 30, whereupon the data are reproduced as diffraction light corresponding to the interference fringes recorded in the hologram recording medium 30. The diffraction light is focused on an image pickup apparatus 49 such as a CCD pickup apparatus or a CMOS pickup apparatus by a lens (inverse Fourier lens) 48. The image pickup apparatus 49 photoelectrically converts the received diffraction light and analyzes a resulting received light signal to reproduce the same as image data.

Such a hologram recording and reproduction system as just described uses a technique called multiplex recording to achieve a high recording density. Different from conventional recording techniques, the multiplex recording records a large number of pages at a place. As representative ones of such multiplex recording methods, angle multiplex recording, shift multiplex recording and phase code multiplex recording are available. Further, various other multiplex recording methods such as speckle multiplex recording are known.

Incidentally, whichever multiplex recording method such a hologram recording and reproduction system as described above uses, it has a problem that, when interference fringes produced by the signal light 100 and the reference light 200 are recorded into the hologram recording medium 30, a portion of the hologram recording medium 30 other than a region to be recorded originally is exposed to unnecessary light. This is described in detail with reference to the drawings.

Figure 10:
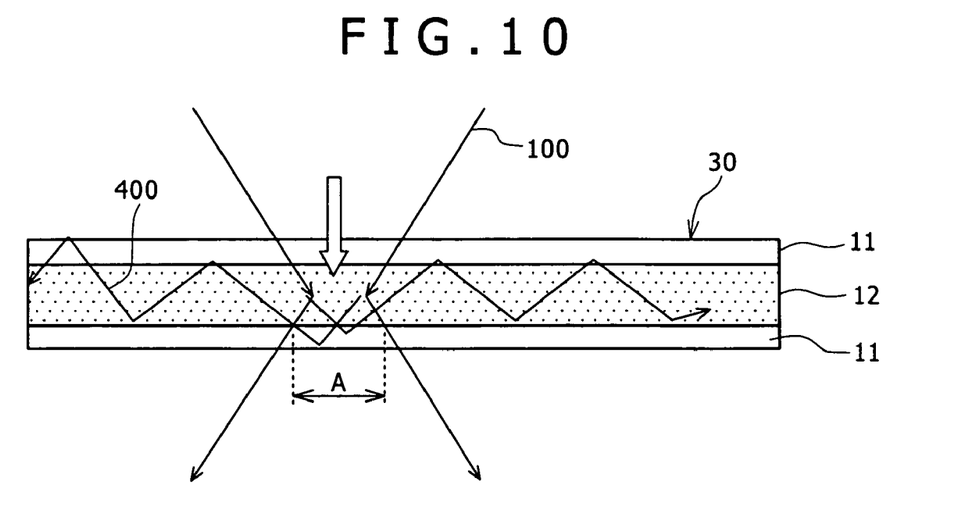
FIGS. 10 and 11 are schematic sectional views illustrating advancing paths of unnecessary light generated when reference light enters a conventional hologram recording medium.

FIG. 10 is a sectional view illustrating unnecessary light generated from the signal light 100 when interference fringes (data) are to be recorded into a hologram recording medium. The hologram recording medium 30 is formed from a pair of transparent cover glass plates 11 and recording material 12 such as photopolymer sandwiched between the cover glass plates 11. When the signal light 100 enters the hologram recording medium 30 through one of the cover glass plates 11, it passes through a recording region A of the recording material 12 and goes out from the cover glass plate 11 on the opposite side. Thereupon, the signal light 100 interferes with reference light not shown at a portion of the recording region A, whereupon interference fringes are recorded into the portion of the recording region A of the recording material 12.

However, when the signal light 100 enters the hologram recording medium 30, unnecessary light 400 is actually generated which includes scattered light generated by scattering of part of the signal light 100 by the recording material 12 and reflected light by surface reflection at an interfacial boundary between each of the cover glass plates 11 and the recording material 12 or the air. The unnecessary light 400 propagates between the paired cover glass plates 11 disposed in an opposing relationship to each other to a location around the recording region A and sensitizes the area of the recording material 12 other than the recording region A.

Figure 11:
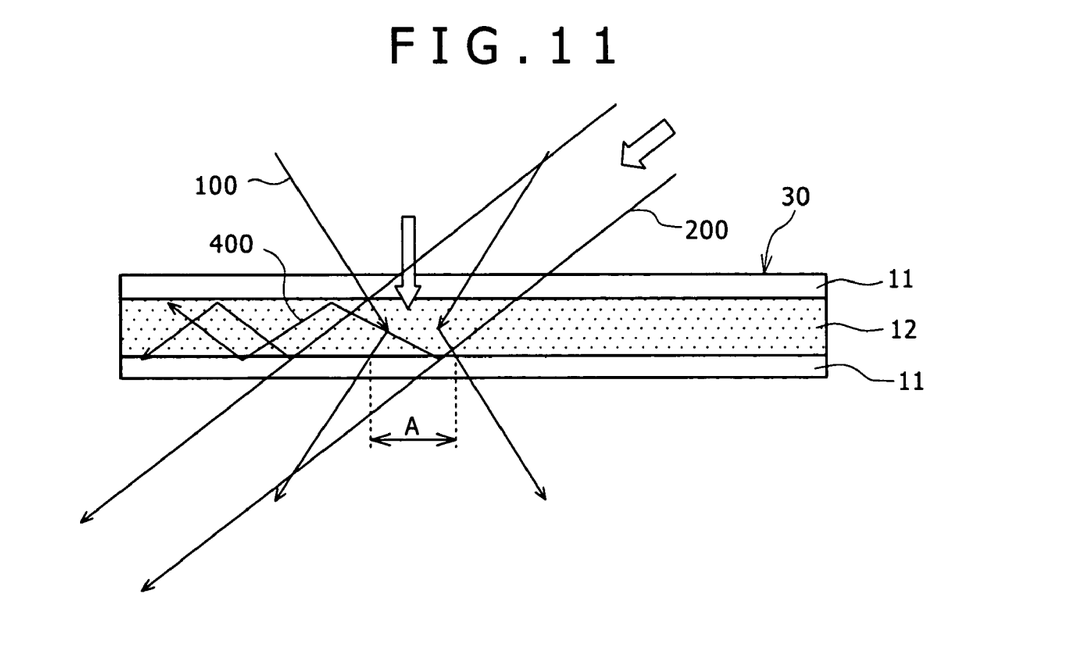

The unnecessary light 400 thus sensitizes a portion other than the portion (recording region A) which originally is to be sensitized, and gives rise to deterioration of a characteristic of the recording material 12 and further has a bad influence on the recording capacity (decreases the recording capacity by an amount of the sensitized portion). It is to be noted that a similar phenomenon is caused also by the reference light 200. For example, where the angle multiplex method is adopted wherein the angle of the reference light 200 is changed to record or reproduce a large number of independent data pages at one place, if the reference light 200 enters at such an angle as indicated by an arrow mark in FIG. 11, unnecessary light 400 is generated likewise by scattering by the material and the surface reflection and sensitizes a portion of the recording material 12 other than the recording region A. Naturally, unnecessary light other than those indicated in FIGS. 10 and 11 is generated.

SUMMARY OF THE INVENTION

It is an object of the present invention to provide a hologram recording medium, a method of producing a hologram recording medium and a hologram recording and reproduction apparatus by which sensitization of a region of the hologram recording medium other than a data recording region can be prevented to prevent deterioration of a characteristic of the hologram recording medium.

In order to attain the object described above, according to an aspect of the present invention, there is provided a hologram recording medium, comprising a recording material for recording interference fringes of signal light and reference light therein, and partition members for portioning the recording material.

According to another aspect of the present invention, there is provided a hologram recording and reproduction apparatus, comprising a hologram recording section for recording interference fringes of signal light and reference light in a hologram recording medium, and an image pickup element for receiving diffraction light produced when illumination reference light same as the reference light is illuminated upon the hologram recording medium to reproduce data corresponding to the interference fringes of the hologram recording medium, the hologram recording medium including a recording material for recording the interference fringes of the signal light and the reference light therein and partition members for portioning the recording material.

According to a further aspect of the present invention, there is provided a method of producing a hologram recording medium in which interference fringes of signal light and reference light are recorded, comprising the steps of forming partition members on a first transparent member, filling recording material into regions partitioned by the partition members, and encapsulating the recording material filled in the regions partitioned by the partition members with a second transparent member.

With the hologram recording medium, hologram recording and reproduction apparatus and method of producing a hologram recording medium, since the recording material is partitioned with the partition members, upon recording, unnecessary light generated when signal light and reference light enter the recording material is blocked from propagating in the recording material by the partition members. Consequently, unnecessary sensitization of a region of the recording material other than a data recording region can be prevented. Therefore, deterioration of a characteristic of the hologram recording medium, particularly decrease of the recording capacity, can be prevented. Consequently, for example, where the hologram recording and reproduction apparatus adopts a multiplex recording system, the performance of the hologram recording and reproduction apparatus can be exhibited fully.

Further, since unnecessary recording with scattered light components such as unnecessary light is prevented, the noise of reproduction holograms decreases, and as a result, the recording density of the hologram recording medium can be enhanced.

As a secondary effect of the provision of the partition members in the hologram recording medium, since the partition members act in a direction in which the thickness of the hologram recording medium is maintained, the shrink of the hologram recording medium can be moderated. As a result, the quality of a hologram reproduction image can be enhanced.

Further, where the hologram recording medium is a photopolymer material, the presence of the partition members makes it possible to perform an after-cure process only in the inside of the partitions. As a result, the hologram recording medium allows additional recording of data therein.

Further, since admission of external moisture can be prevented due to the presence of the partition members, deterioration of the photopolymer material by moisture can be prevented.

The above and other objects, features and advantages of the present invention will become apparent from the following description and the appended claims, taken in conjunction with the accompanying drawings in which like parts or elements are denoted by like reference symbols.

DETAILED DESCRIPTION OF THE PREFERRED EMBODIMENTS

Figure 1:
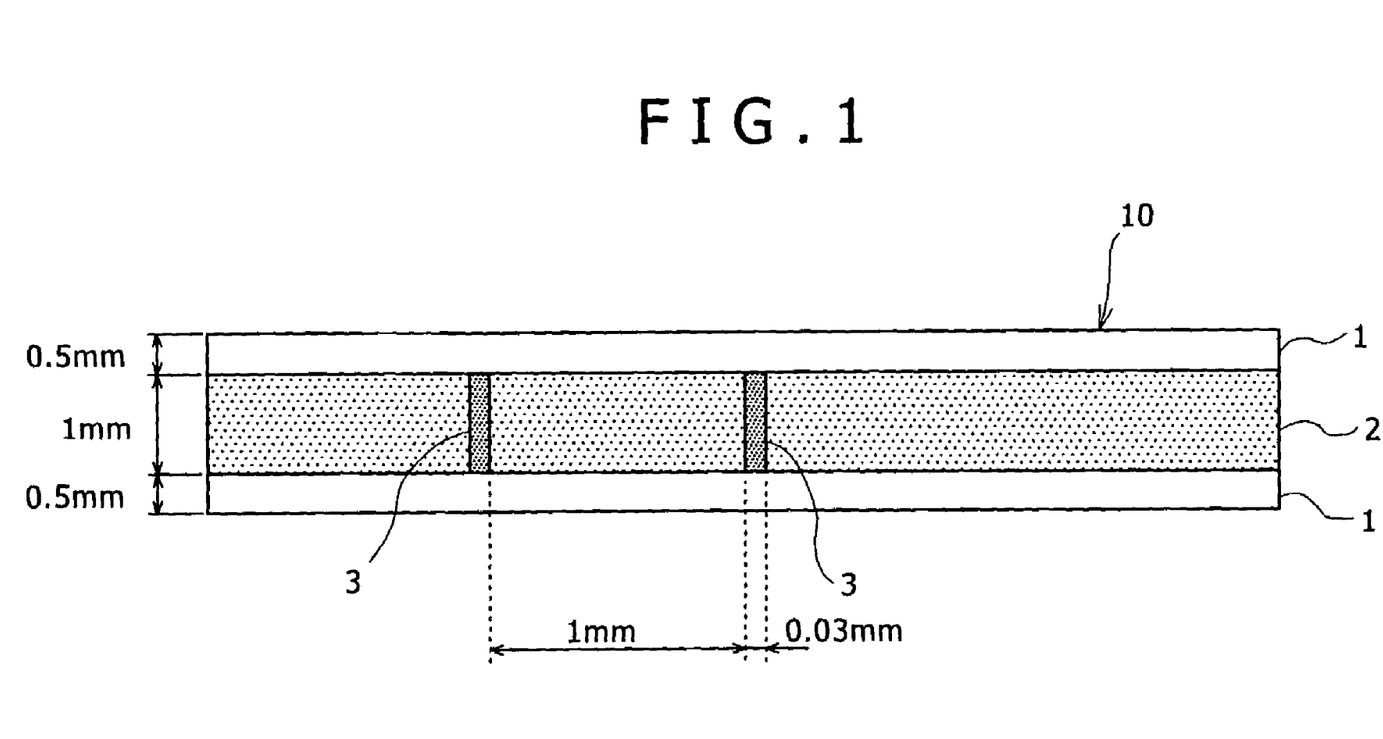
FIG. 1 is a side elevational view showing a configuration of a hologram recording medium according to a first embodiment of the present invention.
Figure 2A:
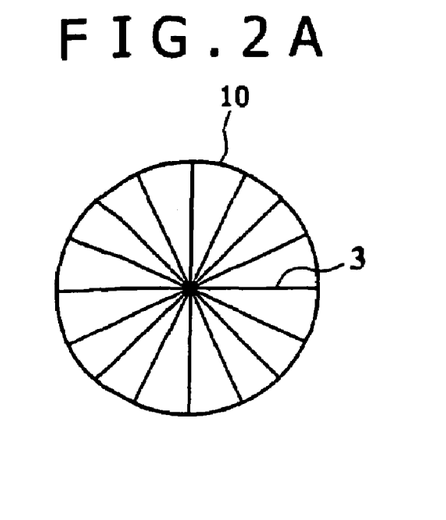
FIGS. 2A to 2E are plan views of different forms of the hologram recording medium shown in FIG. 1.
Figure 2B:
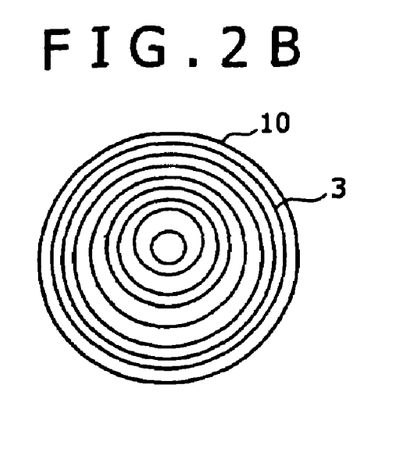
Figure 2C:
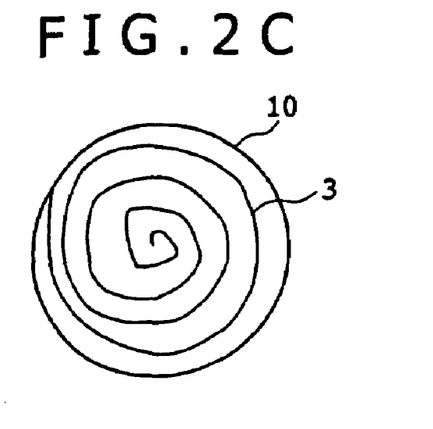
Figure 2D:
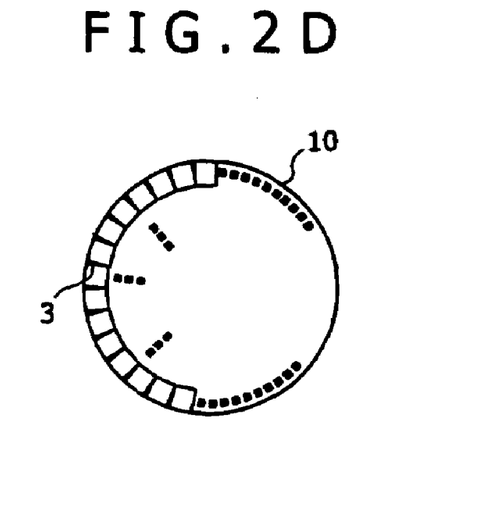
Figure 2E:
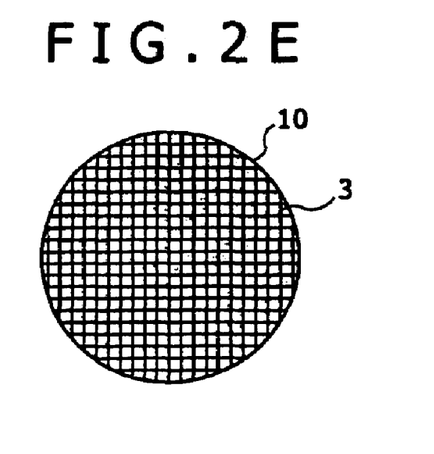

Referring to FIG. 1, there is shown in side elevational view a configuration of a hologram recording medium according to a first embodiment of the present invention. The hologram recording medium 10 includes a pair of transparent cover glass plates 1 and recording material 2 such as photopolymer sandwiched between the cover glass plates 1. The hologram recording medium 10 further includes a plurality of partition members 3 extending perpendicularly to the cover glass plates 1 to partition the recording material 2 into a plurality of partitions. However, reference light is not shown for the convenience of illustration. The hologram recording medium 10 may be a recording medium of a disk type having a diameter of approximately 12 cm. Further, while the hologram recording medium 10 includes a plurality of partition members 3, only two such partition members 3 are shown in FIG. 1 for the convenience of illustration. The partition members 3 are formed with a thickness of approximately 0.03 mm, for example, from a light absorbing material and are disposed such that the distance between adjacent ones of the partition members 3 is approximately 1 mm. It is to be noted that cover members made of a material having a light transmitting property such as a transparent plastic material may be used in place of the cover glass plates 1.

FIGS. 2A to 2E are plan views of different forms of the hologram recording medium 10 shown in FIG. 1. In the hologram recording medium 10 shown in FIG. 2A, the partition members 3 are disposed to extend radially. In the hologram recording medium 10 shown in FIG. 2B, the partition members 3 are disposed concentrically and partition the recording material 2 into annular rings. In the hologram recording medium 10 shown in FIG. 2C, the partition members 3 are disposed convolutionally to form a single convolutional partition member. In the hologram recording medium 10 shown in FIG. 2D, the partition members 3 are disposed so as to form a plurality of square or rectangular cells. In the hologram recording medium 10 shown in FIG. 2E, the partition members 3 are disposed in a pattern of projected parallels to form square cells.

Figure 3:
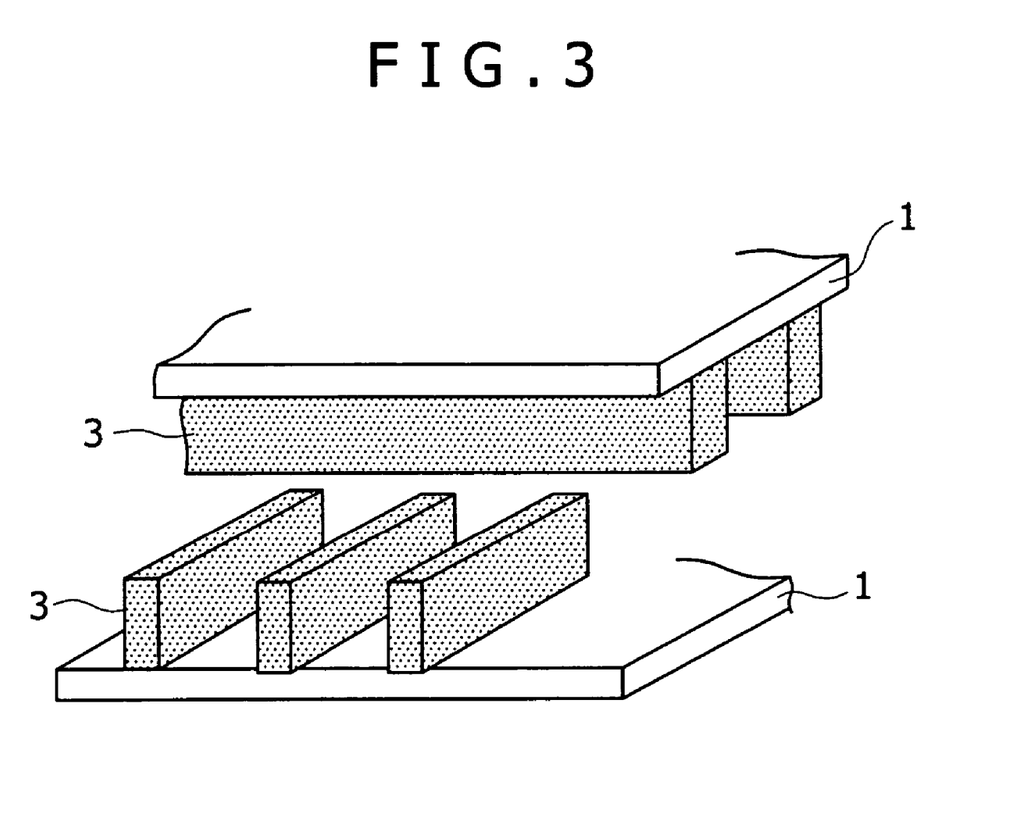
FIG. 3 is a perspective view showing an example of a structure of projected parallels for forming a cell structure.

Although square partitioning as is provided by such partition members as just described is not very practical with a disk type recording medium, this is effective with a square or rectangular recording medium such as a hologram card. It is to be noted that such a cell structure as just described can be formed by a structure of projected parallels like barrier ribs of a plasma display apparatus as shown in FIG. 3.

Figure 4:
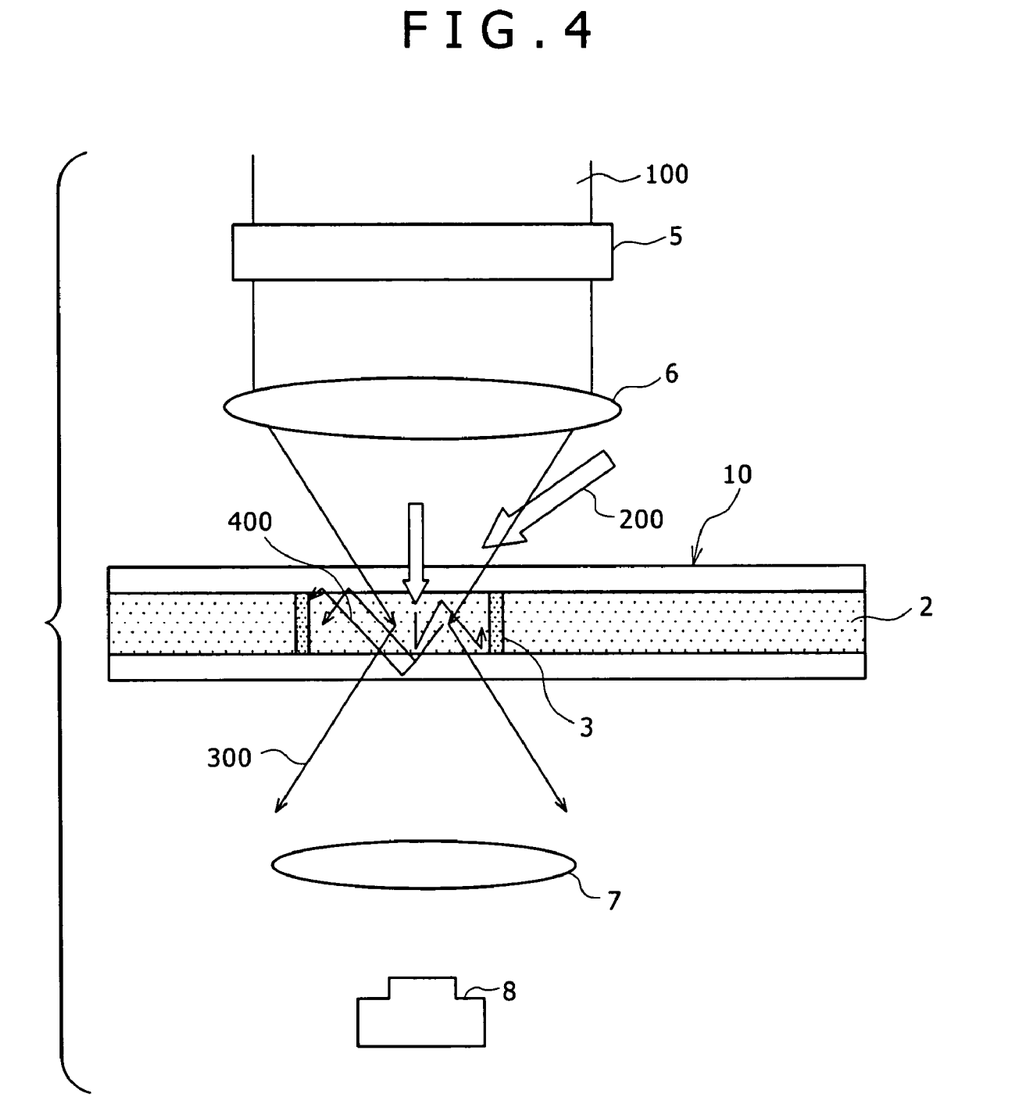
FIG. 4 is a schematic view of a hologram recording and reproduction apparatus in which the hologram recording medium shown in FIG. 1 is set in position.

FIG. 4 shows the hologram recording medium 10 shown in FIG. 1 in a state wherein it is set in position in a hologram recording and reproduction apparatus. Referring to FIG. 4, the hologram recording and reproduction apparatus includes a spatial light modulator 5 for intensity modulating signal light 100 with data to be recorded, and a lens 6 of a recording optical system for condensing the intensity modulated signal light 100 in a recording region of the hologram recording medium 10. The hologram recording and reproduction apparatus further includes a lens 7 of a reproduction optical system for focusing diffraction light 300, which is generated when illumination reference light not shown is illuminated in the recording region (three dimensional range) of the hologram recording medium 10, on an image pickup apparatus 8. The image pickup apparatus 8 photoelectrically converts and analyzes an optical image focused thereon to obtain reproduction data. It is to be noted that a reference optical system for illuminating the reference light 200 is not shown in FIG. 4.

Now, operation of the present embodiment is described. Upon recording, the signal light 100 enters one of the cover glass plates 1 of the hologram recording medium 10, passes through the recording region of the recording material 2, and goes out from the other cover glass plate 1 on the opposite side. Thereupon, the signal light 100 interferes with the reference light 200 at a portion in the recording region, whereupon interference fringes are recorded in the recording region of the recording material 2. In this instance, unnecessary light 400 is generated which includes scattered light generated by scattering of part of the signal light 100 by the recording material 2 and reflected light by surface reflection at an interfacial boundary between each of the cover glass plates 1 and the recording material 2 or the air. The unnecessary light 400 propagates between the paired cover glass plates 1 while it is successively reflected by and between the cover glass plates 1. However, the unnecessary light 400 is blocked by the partition members 3 and does not advance to any other place than the places surrounded by the partition members 3.

Figure 5A:
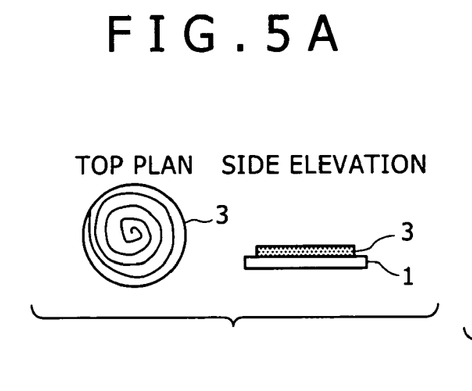
FIGS. 5A to 5F are schematic views illustrating a process of producing a hologram recording medium having partition members which generally have a convolutional shape shown in FIG. 2C.
Figure 5B:
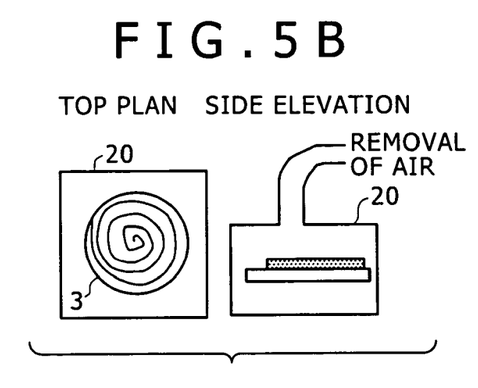
Figure 5C:
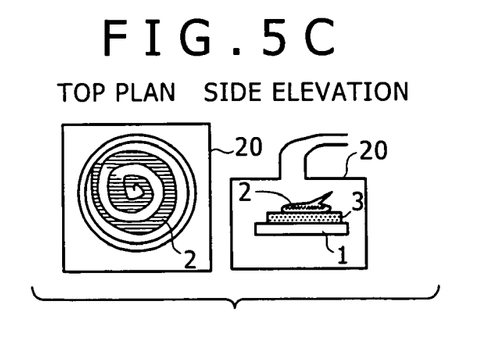
Figure 5D:
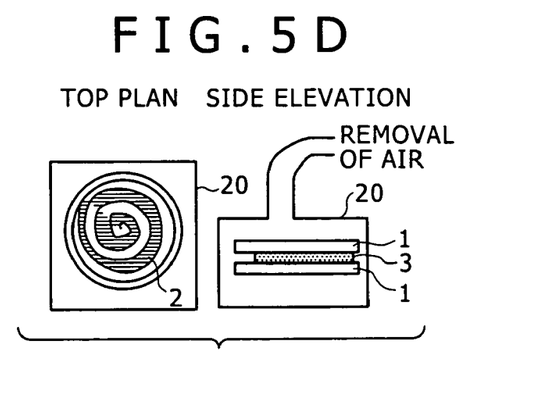
Figure 5E:
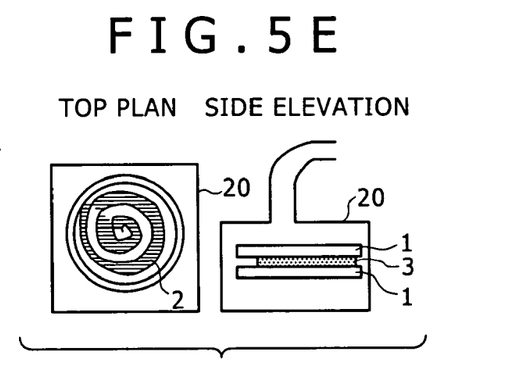
Figure 5F:
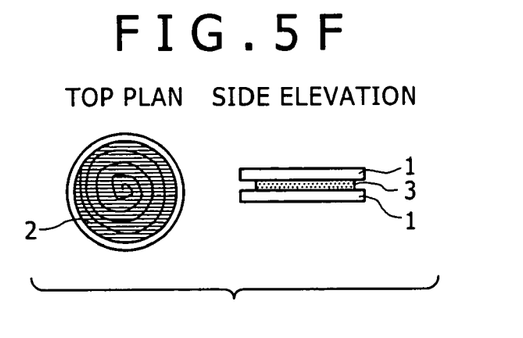

FIGS. 5A to 5F illustrate an example of a process of producing the hologram recording medium 10 of the convolutional type. First, partition members 3 connecting to each other a convolutional configuration are produced on a cover glass plate 1 by screen printing as seen in FIG. 5A. Then, the cover glass plate 1 and the partition members 3 formed on the cover glass plate 1 are accommodated into a vacuum chamber 20 and decompressed into a vacuum state as seen in FIG. 5B. Thereafter, recording material 2 in the form of liquid is dropped from above the convolutional partition members 3 as seen in FIG. 5C, and another cover glass plate 1 is placed from above on the partition members 3 to encapsulate the recording material 2 into the partition members 3 as seen in FIG. 5D. Then, the vacuum chamber 20 is opened to the atmospheric air as seen in FIG. 5E to allow the recording material 2 to be filled uniformly into the space defined by the partition members 3, and then the article is taken out. Consequently, a hologram recording medium 10 wherein the recording material 2 is partitioned convolutionally by the partition members 3 as shown in FIG. 5F is completed.

According to the present embodiment, upon recording, unnecessary light 400 generated from the signal light 100 and the reference light 200 illuminated upon the hologram recording medium 10 can be confined within the partitions including a recording region of the hologram recording medium 10 so that it does not propagate any more in the recording material 2. The unnecessary light 400 prevents to expose the portion other than the recording region of the recording material 2. Accordingly, the hologram recording medium 10 is free from deterioration in characteristic and can keep a recording capacity conforming to the specifications. It is to be noted that, in order to eliminate reflection of unnecessary light by the partition members 3, the partition members 3 contain a light absorbing agent such as a composite dyestuff or are formed from a light absorbing material having a non-reflective coating provided on a surface thereof.

Further, since unnecessary recording with scattered light components such as the unnecessary light 400 is prevented, the noise of reproduction holograms decreases, and as a result, the recording density of the hologram recording medium 10 can be enhanced.

As a secondary effect of the provision of the partition members 3 on the hologram recording medium 10, the shrink of the recording material 2 can be reduced. The hologram recording medium 10 exhibits a variation in volume by an external pressure or as a result of a reaction upon hologram recording. However, the presence of the partition members 3 acts in a direction in which the thickness of the recording material 2 is maintained. As a result, the quality of a hologram reproduction image can be enhanced.

Where the recording material 2 is a photopolymer material, it is often the case to use light to complete the reaction after hologram recording (after-cure process). Usually, in this process, the recording material 2 is illuminated entirely with the light. Therefore, it is impossible to record a hologram only at a portion of the recording material, but the recording material is after-cured entirely. However, the presence of the partition members 3 makes it possible to perform the after-cure only in the inside of the partition. Therefore, the recording material 2 allows additional recording of data therein.

Further, although a photopolymer material is normally vulnerable to the moisture, since admission of external moisture can be prevented due to the presence of the partition members 3, deterioration of the hologram recording medium 10 by moisture can be prevented. In this instance, the outermost air hole of the hologram recording medium 10 is filled up after photopolymer is filled.

Figure 6:
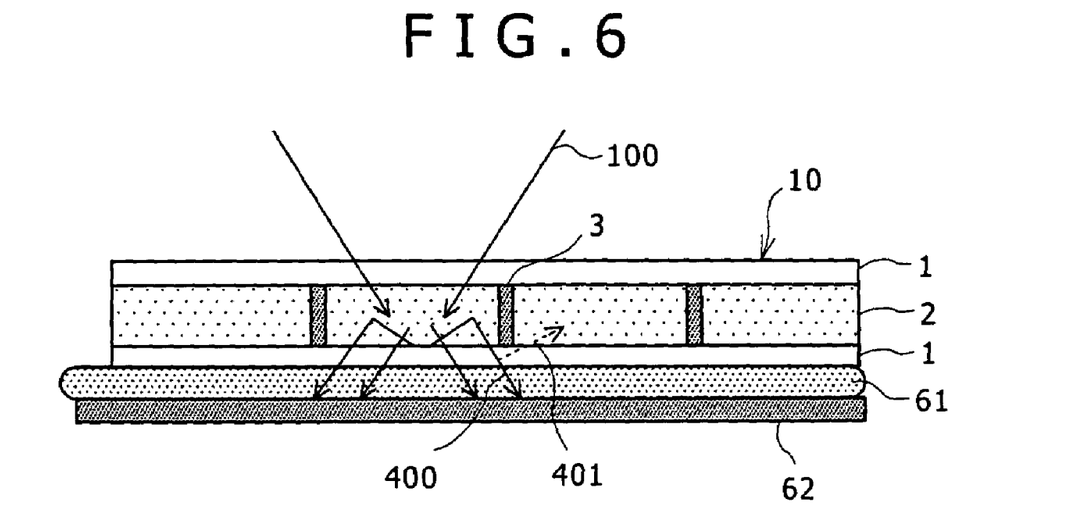
FIG. 6 is a side elevational view showing a configuration of a hologram recording medium according to a second embodiment of the present invention.

FIG. 6 shows in side elevation a configuration of a hologram recording medium according to a second embodiment of the present invention. Also the hologram recording medium 10 of the present embodiment includes a pair of cover glass plates 1, recording material 2 sandwiched between the cover glass plates 1, and partition members 3 for partitioning the recording material 2. A light absorbing member 62 is disposed on the cover glass plate 1 on the rear face of the hologram recording medium 10 with index matching liquid 61 interposed therebetween. The index matching liquid 61 has a refractive index substantially equal to that of the cover glass plates 1. The hologram recording medium 10 is rotatable on and removable from the light absorbing member 62 using the index matching liquid 61 as a slide.

Operation of the present embodiment is described. Upon recording, unnecessary light 400 generated from signal light 100 and reference light illuminated upon the hologram recording medium 10 is blocked from propagation thereof by the partition members 3. However, if the index matching liquid 61 does not exist, then depending upon the light path of the unnecessary light 400, the unnecessary light 400 is partly reflected by an interfacial boundary between one of the cover glass plates 1 and the air layer, thereby generating unnecessary light 401 that advances into a neighboring partition exceeding a partition member 3. However, where the index matching liquid 61 having a refractive index substantially equal to that of the cover glass plates 1 is held in close contact with the cover glass plate 1, then the unnecessary light 400 passes through the cover glass plate 1 and the index matching liquid 61 and is absorbed by the light absorbing member 62 underlying the index matching liquid 61. Consequently, the unnecessary light 400 can be prevented from exceeding the partition members 3 and entering the neighboring partitions.

It is to be noted that, upon reproduction, since reproduction is performed with the index matching liquid 61 and the light absorbing member 62 removed from the hologram recording medium 10, diffraction light generated from the hologram recording medium 10 when illumination reference light is illuminated can be introduced into the reproduction optical system without any interference to reproduce data.

According to the present embodiment, since the unnecessary light 401 which advances into an adjacent partition through a cover glass plate 1 exceeding a partition member 3 can be eliminated, useless sensitization of the hologram recording medium 10 by the unnecessary light 400 can be eliminated completely, and otherwise possible deterioration in performance of the hologram recording medium 10 can be eliminated.

Further, also with regard to a partition into which the signal light 100 and the reference light 200 enter, since the unnecessary light 400 having passed through a cover glass plate 1 once is absorbed by the light absorbing member 62 and does not enter back into the original partition, the degree of sensitization of the partition by the unnecessary light 400 can be reduced when compared with the first embodiment. Consequently, otherwise possible deterioration in performance of the hologram recording medium 10 can be eliminated.

It is to be noted that the present invention is not limited to the embodiments described above, but can be carried out in various forms in terms of the configuration, function, action and effect without departing from the spirit and scope thereof. For example, while, in the embodiments described above, the process of producing the hologram recording medium 10 by producing the partition walls by screen printing is described above, for the production of the partition walls, various methods can be applied such as, for example, a sand blasting method, a lift-off method and a photosensitive paste method.

Figure 7:
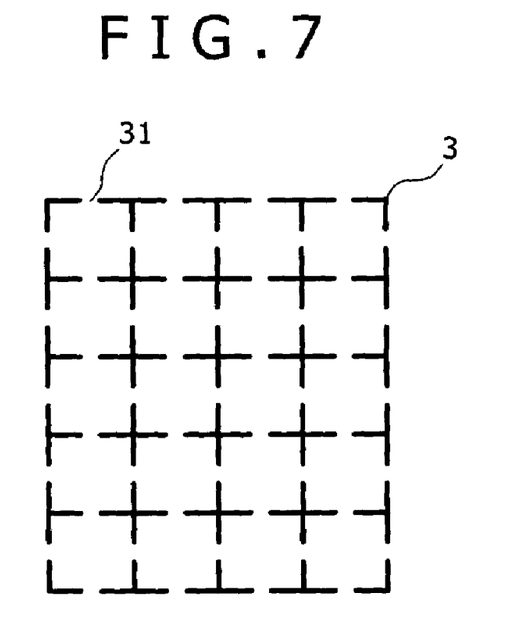
FIG. 7 is a schematic plan view showing a form of the hologram recording medium shown in FIG. 1.
Figure 8:
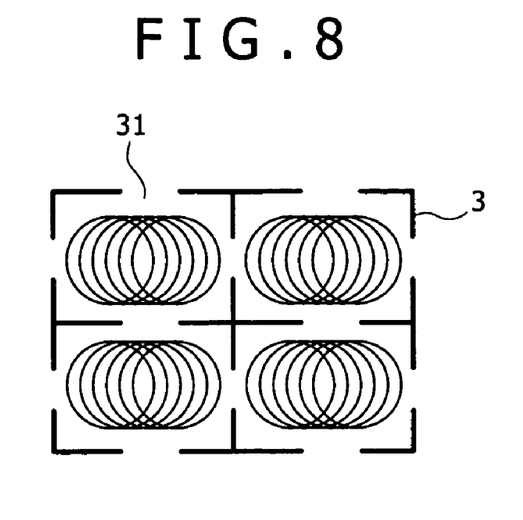
FIG. 8 is a schematic view illustrating multiplex recording of data in cells of the hologram recording medium shown in FIG. 7.

Further, if holes 31 of such a suitable size that unnecessary light does not advance into an adjacent partition therethrough are formed in the partition members 3 as seen in FIG. 7, then when a recording material is filled into the partitions of the hologram recording medium 10, air in the partitions escapes to the outside through the holes 31. Consequently, the filling operation of the recording material can be performed smoothly. Meanwhile, FIG. 8 illustrates a manner when data are recorded by a shift multiplexing method into a recording region in the form of a cell partitioned by the partition members 3 having the holes 31. As seen in FIG. 8, data are multiplex recorded in each cell.

What is claimed is:

1. A hologram recording medium, comprising:
    a recording material for recording interference fringes of signal light and reference light therein;
    at least one partition member for partitioning said recording material;
    at least one hole formed in a wall of said at least one partition member for allowing air in regions partitioned by said at least one partition member to leave said hologram recording medium;
    a removable light absorbing member disposed in a proximity of or in contact with said hologram recording medium; and
    an index matching liquid interposed between said hologram recording medium and said removable light absorbing member, said hologram recording medium being rotatable on and removable from the removable light absorbing member using the index matching liquid as a slide.

2. The hologram recording medium according to claim 1, wherein said hologram recording medium has a disk-like shape, and said recording material, partitioned by said at least one partition member, having one of:
    a radial shape;
    a convolutional shape, said at least one partition member being disposed convolutionally to form a single convolutional partition member;
    an annular shape, such that a plurality of annular partitioned sections are disposed concentrically from the center to an outer circumference of said recording material to form a recording face, said at least one partition member being disposed annularly to form at least one annular ring partition member; and
    a quadrangular cell-like shape such that a plurality of adjacent cells are disposed to form a recording face.

3. The hologram recording medium according to claim 2, wherein said recording material partitioned by said at least one partition member has a radial shape.

4. The hologram recording medium according to claim 2, wherein said recording material partitioned by said at least one partition member has a convolutional shape or an annular shape.

5. The hologram recording medium according to claim 2, wherein said recording material partitioned by said at least one partition member has a quadrangular cell-like shape.

6. The hologram recording medium according to claim 1, wherein said recording material has a pair of light transmitting members between which said recording material is sandwiched, and said at least one partition member is arranged in a direction perpendicular to said pair of light transmitting members.

7. The hologram recording medium according to claim 1, wherein said at least one partition member has a thickness of approximately 0.3 mm.

8. The hologram recording medium according to claim 1, wherein said at least one partition member is formed by at least one of screen printing, sand blasting, lift-off, and photosensitive paste.

9. A hologram recording and reproduction apparatus, comprising:
    a hologram recording section for recording interference fringes of signal light and reference light in a hologram recording medium;
    an image pickup element for receiving diffraction light produced when illumination reference light same as the reference light is illuminated upon the hologram recording medium to reproduce data corresponding to the interference fringes of the hologram recording medium;

the hologram recording medium including a recording material for recording the interference fringes of the signal light and the reference light therein and at least one partition member for partitioning the recording material;

at least one hole formed in a wall of said at least one partition member for allowing air in regions partitioned by said at least one partition member to leave said hologram recording medium;

a removable light absorbing member disposed in a proximity of or in contact with said hologram recording medium; and an index matching liquid interposed between said hologram recording medium and said removable light absorbing member, said hologram recording medium being rotatable on and removable from the removable light absorbing member using the index matching liquid as a slide.

10. The hologram recording and reproduction apparatus according to claim 9, wherein said hologram recording medium has a disk-like shape, and said recording material, partitioned by said at least one partition member, having one of:

a radial shape;

a convolutional shape, said at least one partition member being disposed convolutionally to form a single convolutional partition member;

an annular shape, such that a plurality of annular partitioned sections are disposed concentrically from the center to an outer circumference of said recording material to form a recording face, said at least one partition member being disposed annularly to form at least one annular ring partition member; and quadrangular cell-like shape such that a plurality of adjacent cells are disposed to form a recording face.

11. The hologram recording and reproduction apparatus according to claim 10, wherein said recording material partitioned by said at least one partition member has a radial shape.

12. The hologram recording and reproduction apparatus according to claim 10, wherein said recording material partitioned by said at least one partition member has a convolutional shape or an annular shape.

13. The hologram recording and reproduction apparatus according to claim 10, wherein said recording material partitioned by said at least one partition member has a quadrangular cell-like shape.

14. A method of producing a hologram recording medium in which interference fringes of signal light and reference light are recorded, comprising the steps of:

forming at least one partition member on a first transparent member, a wall of said at least one partition member having at least one hole for allowing air in regions partitioned by said at least one partition member to leave said hologram recording medium;

filling recording material into regions partitioned by the at least one partition member;

encapsulating the recording material filled in the regions partitioned by the at least one partition member with a second transparent member;

disposing a removable light absorbing member in a proximity of or in contact with said hologram recording medium; and interposing an index matching liquid between said hologram recording medium and said removable light absorbing member, said hologram recording medium being rotatable on and removable from the removable light absorbing member using the index matching liquid as a slide.

15. The method of producing a hologram recording medium in which interference fringes of signal light and reference light are recorded according to claim 14, wherein sealing said at least one hole comprises sealing said at least one hole on a periphery of said hologram recording medium having a disk-like shape; and wherein forming at least one partition member comprises forming at least one partition member for partitioning said recording material in one of:

a radial shape formed of spokes, each of said spokes being a single one of said at least one partition member;

a convolutional shape, said at least one partition member being disposed convolutionally to form a single convolutional partition member;

an annular shape, such that a plurality of annular partitioned sections are disposed concentrically from the center to an outer circumference of said recording material to form a recording face, said at least one partition member being disposed annularly to form at least one annular ring partition member; and a quadrangular cell-like shape such that a plurality of adjacent cells are disposed to form a recording face.

16. The method of producing a hologram recording medium in which interference fringes of signal light and reference light are recorded according to claim 15, wherein forming at least one partition member comprises:

forming at least one partition member for partitioning said recording material in a radial shape.

17. The method of producing a hologram recording medium in which interference fringes of signal light and reference light are recorded according to claim 15, wherein forming at least one partition member comprises:

forming at least one partition member for partitioning said recording material in a convolutional shape or an annular shape.

18. The method of producing a hologram recording medium in which interference fringes of signal light and reference light are recorded according to claim 15, wherein forming at least one partition member comprises:

forming at least one partition member for partitioning said recording material in a quadrangular cell-like shape.

* * * * *